(12) United States Patent
Legner et al.

(10) Patent No.: US 7,082,760 B2
(45) Date of Patent: Aug. 1, 2006

(54) DRIVE SYSTEM FOR MOBILE VEHICLES

(75) Inventors: Jürgen Legner, Friedrichshafen (DE); Wolfgang Rebholz, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/880,034

(22) Filed: Jun. 29, 2004

(65) Prior Publication Data

US 2005/0284256 A1    Dec. 29, 2005

(51) Int. Cl.
*F16D 31/02*    (2006.01)
(52) U.S. Cl. .......................................... 60/484; 60/487
(58) Field of Classification Search .................. 60/484, 60/487
See application file for complete search history.

(56) References Cited

U.S. PATENT DOCUMENTS

| | | |
|---|---|---|
| 3,052,098 A | 9/1962 | Ebert |
| 3,300,000 A | 1/1967 | Stoyke |
| 3,426,621 A | 2/1969 | Mooney, Jr. et al. |
| 3,455,184 A | 7/1969 | Frandsen et al. |
| 3,532,006 A | 10/1970 | Polak et al. |
| 3,583,256 A | 6/1971 | Livezey |
| 3,596,535 A | 8/1971 | Polak |
| 3,643,433 A * | 2/1972 | Widmaier .................... 60/486 |
| 4,953,426 A | 9/1990 | Johnson |
| 5,241,822 A | 9/1993 | Pecnik et al. |
| 5,394,771 A | 3/1995 | Schroder |
| 5,946,983 A | 9/1999 | Brambilla |
| 6,953,327 B1 * | 10/2005 | Hauser et al. ................ 60/484 |

FOREIGN PATENT DOCUMENTS

| | | |
|---|---|---|
| DE | 976 055 | 1/1963 |
| DE | 1 918 954 | 10/1970 |
| DE | 1 817 764 | 2/1971 |
| DE | 71 17 729 | 9/1971 |
| DE | 74 25 346 | 3/1976 |
| DE | 33 36 590 | 5/1985 |
| DE | 39 32 975 A1 | 9/1990 |
| DE | 41 30 225 C1 | 11/1992 |
| DE | 697 22 104 T2 | 12/2003 |
| EP | 0 483 543 B1 | 3/1994 |
| WO | WO-99/17021 | 4/1999 |

* cited by examiner

*Primary Examiner*—Thomas E. Lazo
(74) *Attorney, Agent, or Firm*—Davis & Bujold, P.L.L.C.

(57) ABSTRACT

A drive system for a mobile vehicle has hydraulic motors (1, 2) arranged in a transmission housing (3), which drive a drive output shaft (22) via a totalizing transmission gearset, the totalizing transmission and the hydraulic motors (1, 2) being arranged within the transmission housing (3).

13 Claims, 4 Drawing Sheets

DRIVE SYSTEM FOR MOBILE VEHICLES

FIELD OF THE INVENTION

The invention concerns a drive system for a mobile vehicle, in particular a construction machine.

BACKGROUND OF THE INVENTION

Drive systems of this type for mobile vehicles are used for example for powering a wheel loader, wheel bagger or grader, the torque from a first hydraulic motor and a second hydraulic motor being summed by a totalizing or summing transmission gearset in order to power the drive wheels of the vehicle.

EP 0 483 543 B1 discloses a hydrostatic drive system for an earth-mover vehicle, in which a first axial-piston hydraulic motor and a second axial-piston hydraulic motor are connected to a totalizing transmission housing, the axial hydraulic motor being sealed in a fluid-tight way relative to the transmission housing so that the transmission gearset and the hydraulics require separate oil supply systems.

The purpose of the present invention is to provide a drive system for a mobile vehicle with two hydraulic motors and a totalizing transmission, characterized by a small number of components and a simple hydraulic system.

SUMMARY OF THE INVENTION

According to the invention the drive system comprises two radial piston hydraulic motors, as described for example in WO 99/17021, whose content should be taken as integral to the present document. The hydraulic motors are connected with a totalizing transmission in such manner that the torque of the two hydraulic motors can be summed and is available at the drive output shaft of the totalizing transmission. The two hydraulic motors and the totalizing transmission as well as any step-down gears present between the totalizing transmission and the hydraulic motors are arranged in a single transmission housing, the hydraulic motors being designed so that their leakage can pass directly into the transmission housing. Preferably, the transmission housing is the pressure medium reservoir for supplying the pumps and hydraulic motors with pressure medium and for supplying the transmission components with lubricant.

In a further embodiment of the invention the transmission housing consists of two main parts, and the cylinders mounted to rotate are each fitted in one main part of the transmission. Preferably, on the transmission housing there is a filter device by means of which pressure medium is drawn from the transmission housing, filtered and passed to a pump.

In another embodiment, an electronic-hydraulic control module is attached to the transmission housing, and preferably the transmission housing has an opening in this area through which part of the hydraulic control unit projects into the transmission housing. The electronic control unit is preferably arranged on the hydraulic control unit and connected thereto. It is possible to arrange delivery lines from the hydraulic control unit to consumers located inside the transmission housing or to form the delivery lines within the wall of the transmission housing. Preferably, the pre-control valves that control hydraulic valves are arranged in the hydraulic control unit connected to the electronic control unit.

In another embodiment of the invention, the crankshaft of the hydraulic motor is mounted on one side in one part of the transmission housing and on the other side in the other part of the transmission housing. Concentric with the crankshaft there is a pressure medium distribution cover in which are arranged the hydraulic valves that are controlled by the pre-control valves and by which the pressure medium is distributed to the pistons of the hydraulic motor.

In another embodiment of the invention there is a parking brake inside the transmission housing on the drive output shaft.

In a further embodiment of the invention, the two hydraulic motors are arranged so that they are positioned above the surface of the pressure medium, in the transmission housing, to reduce splash losses.

In a further embodiment of the invention, the hydraulic motors are arranged so that the pistons of one motor engage in the intermediate spaces between those of the other motor. Preferably, the drive output shaft is designed so that it passes right through the transmission housing, whereby a concentrically arranged drive output is made possible on either side.

Since the hydraulic motors and the totalizing transmission as well as step-down gears and shift devices and the pressure medium reservoir are all arranged inside the transmission housing, a compact drive system for mobile vehicles is achieved having the feature of a simple hydraulic circuit.

The pressure medium feeds, for absorption volume adjustment, are arranged on as small as possible a diameter of the motor shaft.

Since the motors are not arranged on the drive output shaft, the pressure medium feed for adjusting the stroke volume can be arranged on one side of the crankshaft in the crankshaft and connected to the high pressure. Thus, the seal can be arranged on a small diameter, allowing high speeds even at high pressures.

BRIEF DESCRIPTION OF THE DRAWINGS

The invention will now be described, by way of example, with reference to the accompanying drawings in which.

DETAILED DESCRIPTION OF THE INVENTION

Figure 5:
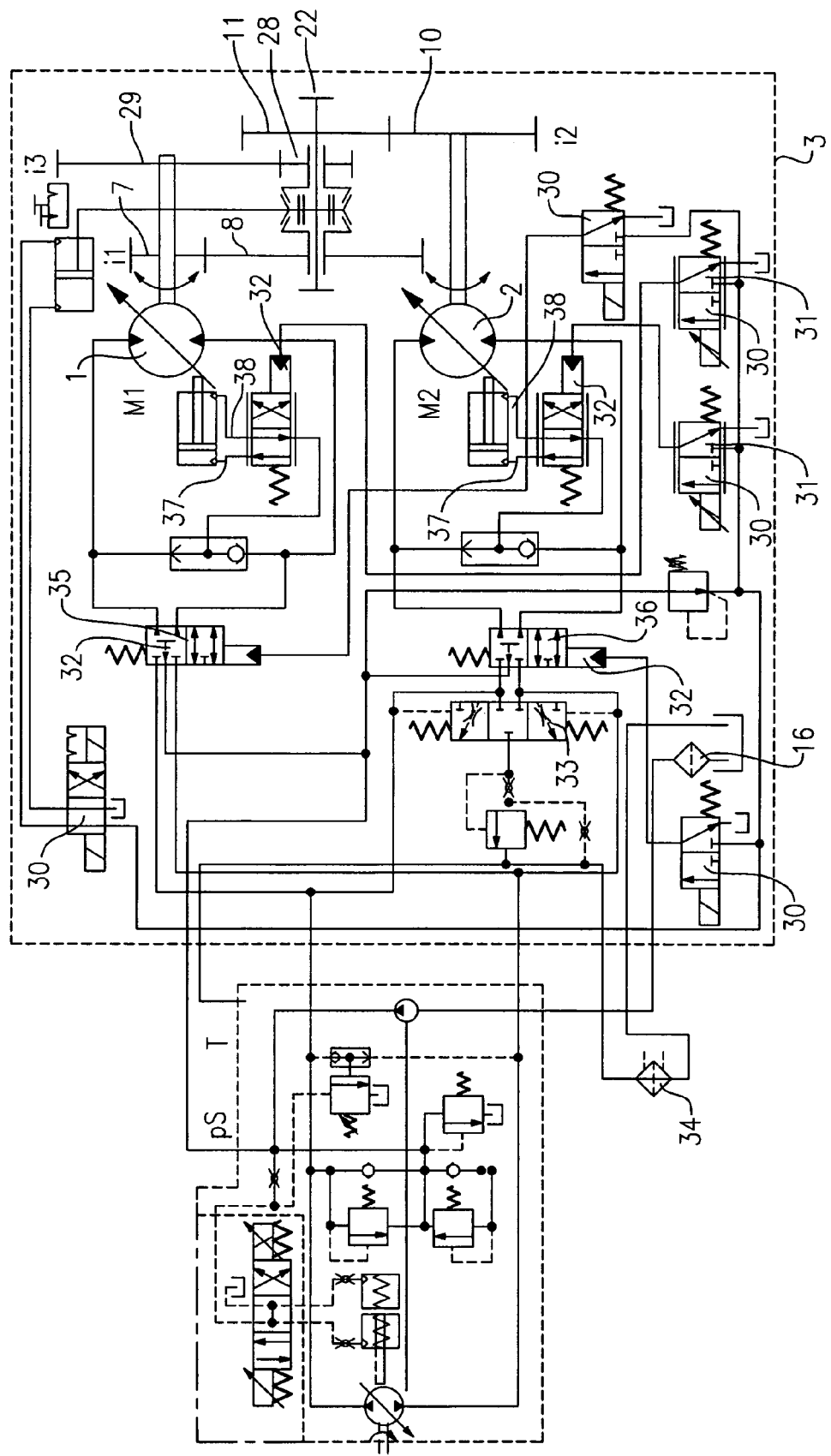
FIG. 5 shows a transmission hydraulics layout with two hydraulic motors, a totalizing transmission and a shiftable step-down gear.

FIG. 1:

A first motor 1 and a second motor 2 are arranged inside a transmission housing 3. The hydraulic motors are made like those in WO 99/17021, so that stroke volume adjustment can also be carried out purely hydraulically, since the adjustment piston in the crankshaft comprises pistons that can be acted upon by the high pressure. The pistons 4 and cylinders 5 of motor 1 engage in intermediate spaces between the pistons 4 and cylinders 5 of motor 2, so that the drive unit can be made compact. The drive output shaft 6 of motor 1 drives a spur gear 7 which is in active engagement with a spur gear 8 in rotationally fixed connection with a drive output shaft 22 (see FIG. 2). The drive output shaft 9 of motor 2 drives a spur gear 10 which is in active engagement with a spur gear 11 in rotationally fixed connection with the drive output shaft 22. The transmission housing 3 has an opening 12 through which a hydraulic control unit 13 projects into the transmission hosing 3, this being connected to the transmission housing 3 by leakproof sealing means 14. On the hydraulic control unit 13 is arranged an electronic control unit 15, which controls the pre-control valves arranged in the hydraulic control unit 13. A filter unit 16 (see FIG. 5) is connected to the transmission housing 3, through which the pressure medium present in the transmission housing 3 is drawn out, filtered, and passed to a pump (not shown).

FIG. 2:

The cylinders 5 of motor 1 are mounted in the transmission housing 3 by means of a first bearing 17 and a second bearing 18. The bearing 17 is mounted in a first half 19 of the transmission housing while the bearing 18 in a second half 20 thereof. The separation line 21 between the halves 19 and 20 of the transmission housing is located between the bearings 17 and 18. A spur gear 7 is in rotationally fixed connection with the drive output shaft 6, of the motor 1, which is made as a crankshaft. The spur gear 7 meshes with a spur gear 8 which is in rotationally fixed connection with the drive output shaft 22. Via the spur gear 10 shown in FIG. 1, the motor 2 of FIG. 1 drives the spur gear 11 which is also in rotationally fixed connection with the drive output shaft 22. On the drive output shaft 22 there is a parking brake 23, which is arranged within the transmission housing 3. The drive output shaft 22 passes completely through the transmission housing 3, so that a drive output flange 24 can be arranged on each side of the transmission housing. On half 19 of the transmission housing is arranged a pressure medium distribution cover 25, in which is arranged the hydraulic valves controlled by the pre-control valves and which has feed connections for the high- and low-pressure delivery lines and passes the volume flow from a hydraulic pump into feed lines 26 arranged in the transmission housing half 19 and to the cylinders 5. The feed lines 26 and optionally also the bearings 17 can also be accommodated in a cover set into the transmission housing half 19. This enables the cover to be made as a hydraulic-grade casting and the remainder of the transmission housing half 19 as a sand casting. Thus, the transmission housing only has hydraulic supply lines and control lines to the electronic control unit, which considerably facilitates installation in the vehicle. The connection lines of the pre-control valves to the hydraulic valves are preferably arranged inside the transmission housing 3. The pressure medium feeds 37 and 38 are arranged with seals 39 in the housing portion 19 or in one (or two) covers, on as small as possible a diameter of the drive output shaft 6.

Figure 1:
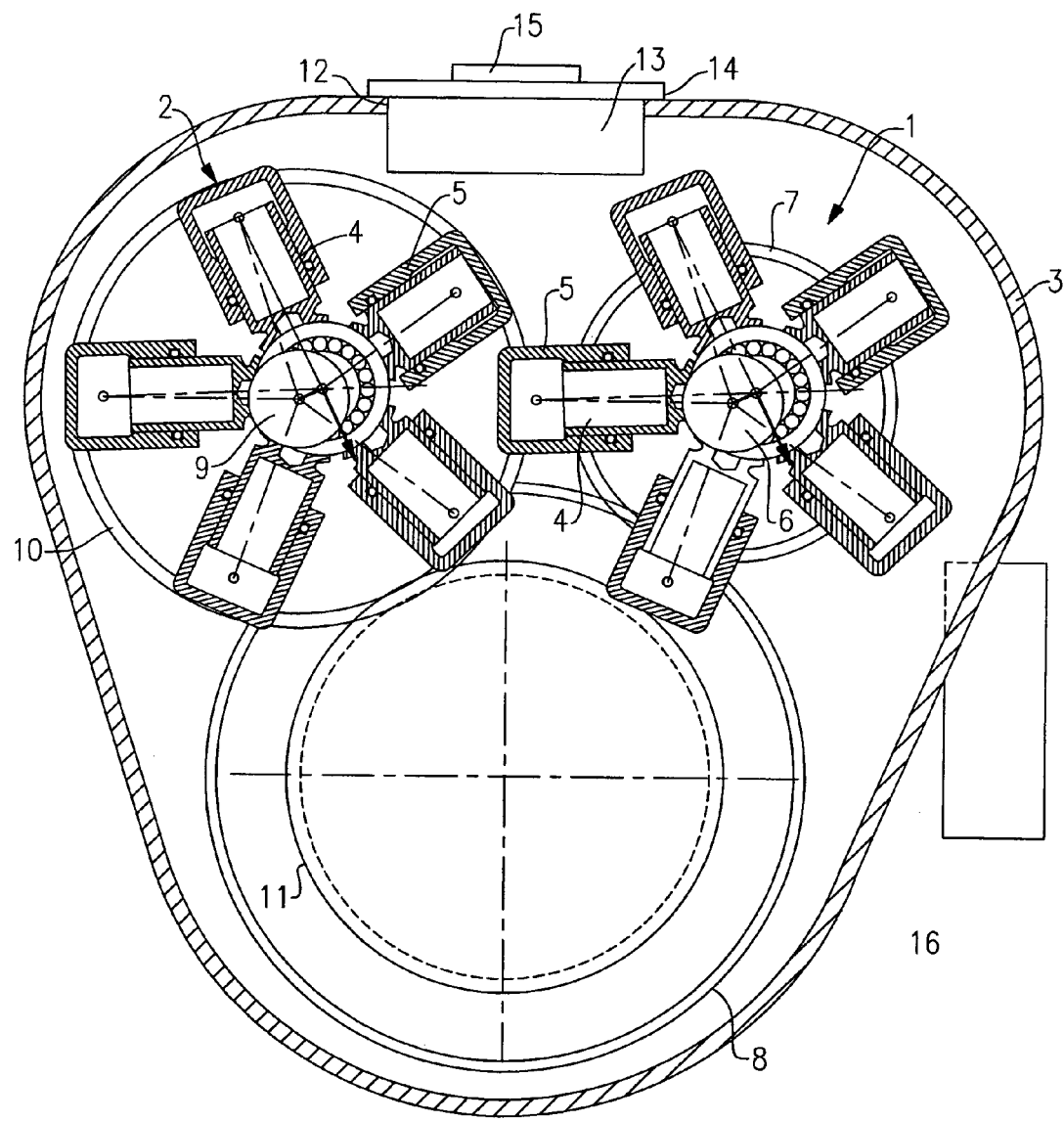
FIG. 1 shows a section through the drive system according to the invention.
Figure 2:
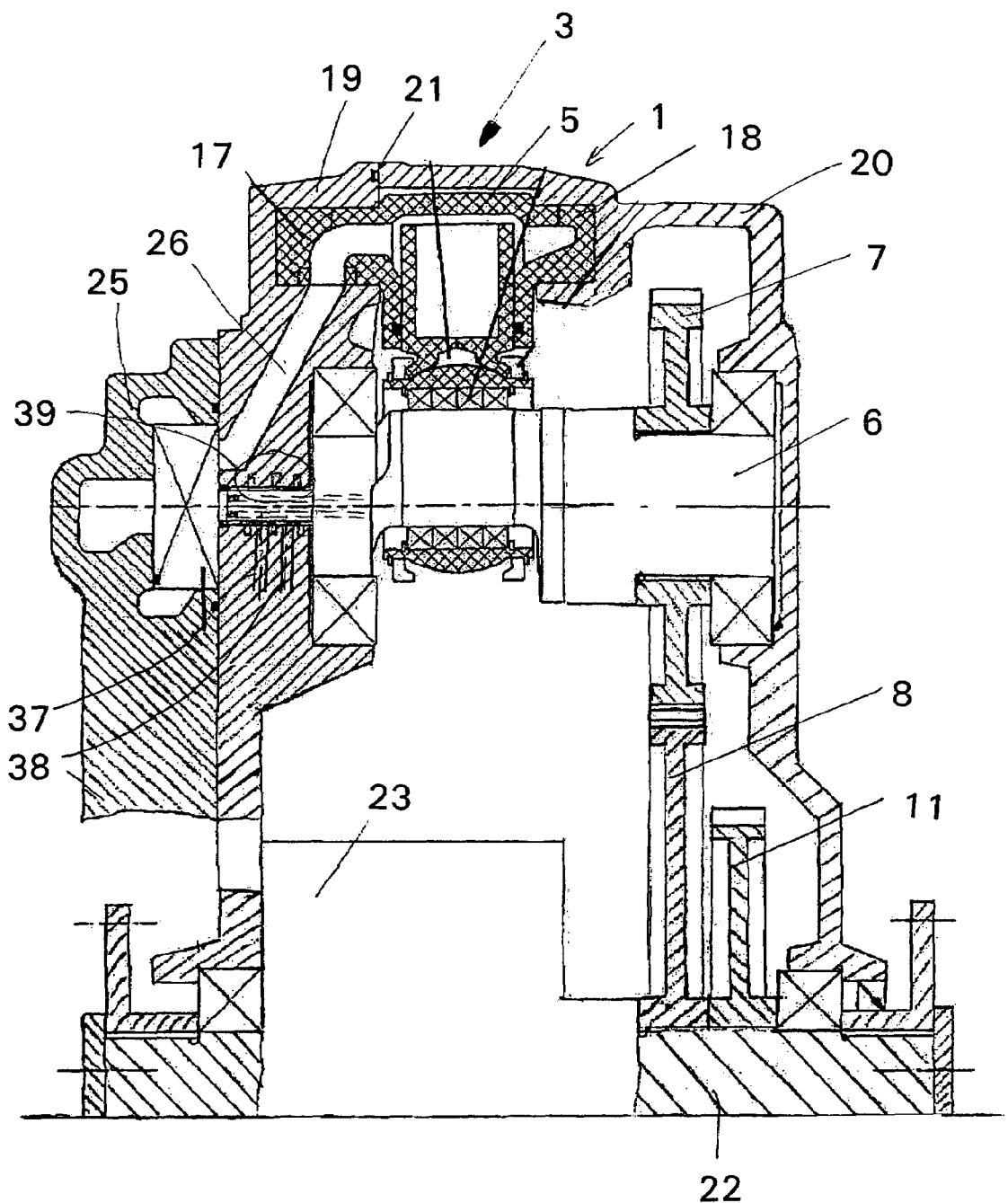
FIG. 2 shows a section through the drive system according to the invention.
Figure 3:
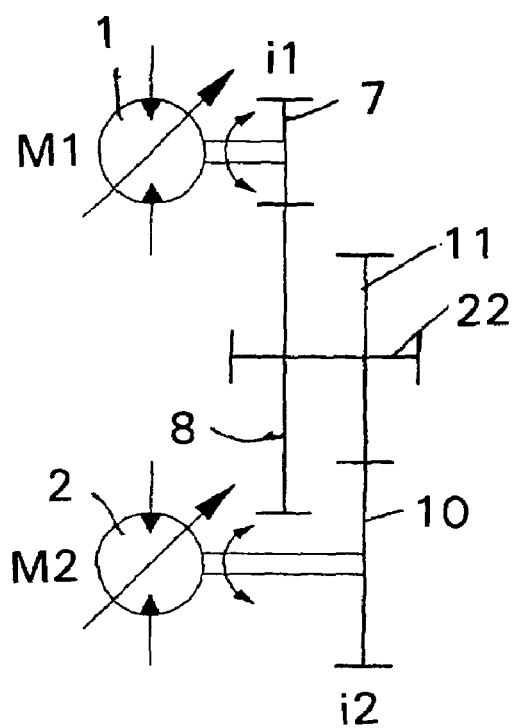
FIG. 3 shows a transmission layout with two hydraulic motors and a totalizing transmission.

FIG. 3:

FIG. 3 shows the transmission layout of the drive system explained in FIGS. 1 and 2.

Figure 4:
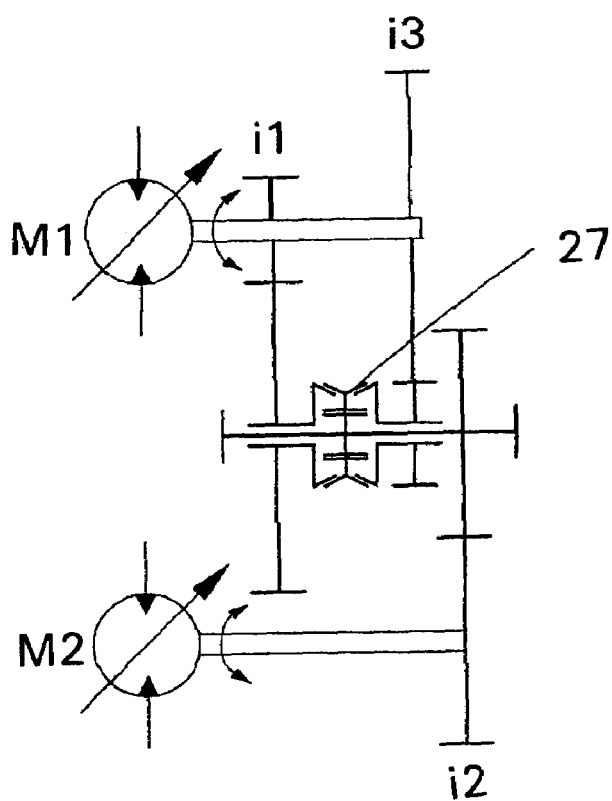
FIG. 4 shows a transmission layout with two hydraulic motors, a totalizing transmission and a shiftable step-down gear.

FIG. 4:

The drive system shown in FIGS. 1 and 2 can be made with the transmission layout of FIG. 4, which enables the drive system to be used for heavier working vehicles with higher driving speeds. An additional step-down range is provided by the additional shifting mechanism 27.

FIG. 5:

The motors 1 and 2 are arranged inside the transmission housing 3, such that motor 1 drives spur gear 7 and, in turn, spur gear 8, while motor 2 drives spur gear 10 and, in turn, spur gear 11. Spur gear 11 is in rotationally fixed connection with the drive output shaft 22 and spur gear 8 is in rotationally fixed connection with the shift mechanism 27, which connects either spur gear 8 or spur gear 28 with the drive output shaft 22. Motor 1 drives a spur gear 28 via a spur gear 29. The pre-control valves 30 are arranged in the hydraulic control unit 13 of FIG. 1 and are connected to the electronic control unit 15. The valves 31 are made as proportional valves. The hydraulic valves 32 are arranged in the pressure medium distribution cover 25. Via a flushing valve 33, hot pressure medium is continuously drawn off and cooled by a cooler 34. The filter unit 16 can be arranged in or on the transmission housing 3. To make the drive system compact and use as few shift elements as possible, it is preferable for the motor, which is operated above its maximum permitted speed, to be adjusted in its stroke volume to zero stroke volume and then cut off from the high pressure by the valve 35 or 36. This makes it possible for all the motors to be in permanent active connection with the drive output shaft 22 at maximum drive output speed, so that no additional mechanical disengagement mechanism is needed for the hydraulic motors.

REFERENCE NUMERALS 1 motor
2 motor
3 transmission housing
4 piston
5 cylinder
6 drive output shaft
7 spur gear
8 spur gear
9 drive output shaft
10 spur gear
11 spur gear
12 opening
13 hydraulic control unit
14 seal
15 electronic control unit
16 filter unit
17 bearing
18 bearing
19 transmission housing half
20 transmission housing half
21 parking line
22 drive output shaft
23 parking brake
24 drive output flange
25 pressure medium distribution cover
26 feed line
27 shift mechanism
28 spur gear
29 spur gear
30 pre-control valve
31 proportional valve
32 hydraulic valve
33 flushing valve
34 cooler
35 valve
36 valve
37 pressure medium fed
39 pressure medium feed
39 seals

The invention claimed is:

1. A drive system for a vehicle with at least two hydraulic motors (1, 2) connected with a summing transmission gearset so that torque from the at least two hydraulic motors is summed together for driving a drive output shaft (22), the at least two hydraulic motors (1, 2) each having a plurality of cylinders and associated pistons, and the summing transmission gearset and the at least two hydraulic motors (1, 2) are accommodated within a transmission housing (3);

wherein each of the at least two hydraulic motors (1, 2) is connected to and drives a respective crankshaft (6, 9) which forms an output thereof, and a pressure medium feed (37, 38), for adjusting a stroke volume of the plurality of cylinders of the at least two hydraulic motors (1, 2), is located adjacent one end of respective crankshaft (6, 9).

2. The drive system for a mobile vehicle according to claim 1, wherein leakage from the at least two hydraulic motors (1, 2) flows into the transmission housing (3) and mixes with any pressure medium container therein.

3. The drive system for a mobile vehicle according to claim 1, wherein the at least two hydraulic motors (1, 2) are radial-piston motors supported internally within the transmission housing (3).

4. The drive system for a mobile vehicle according to claim 1, wherein the transmission housing (3) comprises first and second housing halves (19, 20) and the plurality of cylinders (5) of the at least two hydraulic motors (1, 2) are located within the first and second housing halves (19, 20).

5. The drive system for a mobile vehicle according to claim 4, wherein a distribution cover contains pressure oil delivery lines (26) and a respective bearing (17) of each of the at least two hydraulic motors (1, 2), supporting one end of the crankshaft (6, 9), is accommodated by the first housing half (19) of the transmission housing (3).

6. The drive system for a mobile vehicle according to claim 1, wherein a hydraulic control unit (13) is positioned in an opening (12) of the transmission housing (3).

7. The drive system for a mobile vehicle according to claim 6, wherein an electronic control unit (15) is connected to the hydraulic control unit (13).

8. The drive system for a mobile vehicle according to claim 6, wherein pre-control valves are arranged in the hydraulic control unit (13).

9. The drive system for a mobile vehicle according to claim 1, wherein a parking brake (23) is arranged inside the transmission housing (3) and coupled to the drive output shaft (22).

10. The drive system for a mobile vehicle according to claim 1, wherein the transmission housing (3) has connections for hydraulic delivery lines and connections for electric control leads.

11. The drive system for a mobile vehicle according to claim 1, wherein a distribution cover contains pressure oil delivery lines (26) and a respective bearing (17) of each of the at least two hydraulic motors (1, 2), supporting one end of the crankshaft (6, 9), is accommodated by the first housing half (19) of the transmission housing (3) adjacent the pressure medium feed (37, 38).

12. A drive system for a vehicle with at least two hydraulic motors (1, 2) connected with a summing transmission gearset so that torque from the at least two hydraulic motors is summed together for driving a drive output shaft (22), the at least two hydraulic motors (1, 2) each having a plurality of cylinders and associated pistons, and the summing transmission gearset and the at least two hydraulic motors (1, 2) are accommodated within a transmission housing (3);

wherein each of the at least two hydraulic motors (1, 2) is connected to and drives a respective crankshaft (6, 9) which supports a respective gear (7, 10), and both respective gears (7, 10) drive at least one other gear (8, 11) which drives the drive output shaft (22), and a pressure medium feed (37, 38), for adjusting a stroke volume of the plurality of cylinders of the at least two hydraulic motors (1, 2), is located adjacent one end of respective crankshaft (6, 9).

13. A drive system for a vehicle with at least two hydraulic motors (1, 2) connected with a summing transmission gearset so that torque from the at least two hydraulic motors is summed together for driving a drive output shaft (22), the at least two hydraulic motors (1, 2) each having a plurality of cylinders and a plurality of pistons, and the summing transmission gearset and the at least two hydraulic motors (1, 2) are accommodated within a transmission housing (3);

wherein each of the at least two hydraulic motors (1, 2) is connected to and rotates a respective crankshaft (6, 9) which both drive a common drive output shaft (22), the plurality of pistons are coupled to and rotate the respective crankshaft (6, 9) as each piston reciprocates within the respective cylinder, and a pressure medium feed (37, 38), for adjusting a stroke volume of the plurality of cylinders of the at least two hydraulic motors (1, 2), is located adjacent one end of respective crankshaft (6, 9).

* * * * *